April 17, 1928.

H. D. PUFFE

AUTO CARRIER RACK

Filed May 4, 1927

INVENTOR.
HENRY D. PUFFE,
BY
F. P. Gorin
ATTORNEY.

Patented Apr. 17, 1928.

1,666,507

UNITED STATES PATENT OFFICE.

HENRY D. PUFFE, OF SEATTLE, WASHINGTON.

AUTO CARRIER RACK.

Application filed May 4, 1927. Serial No. 188,775.

This invention relates to an automobile accessory, being particularly directed to a luggage or other carrier which is mounted on the rear of the vehicle so as to be bodily movable to permit access to that portion of the vehicle between the rear end and the carrier, in which space, for example, the spare tire is usually carried.

The luggage carrier of the present improvement is mounted so that in operative position it is arranged in rear of and substantially overlies the spare tire carrier, and as it is ordinarily difficult with the conventional type of luggage carrier to reach the spare tire carrier for the application or removal of the spare tire, the luggage carrier of the present improvement is designed to permit it to be bodily swung away from such tire carrier to permit full and convenient access thereto when desired.

The invention is illustrated in the accompanying drawings, in which.

Figure 1:
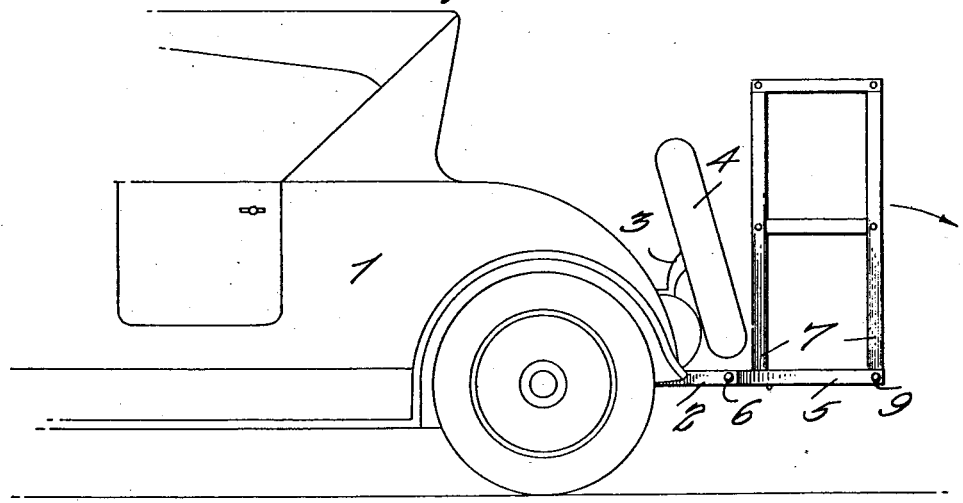
Figure 1 is a view in elevation of a portion of the vehicle showing the improved luggage carrier connected thereto.

In carrying out the present invention, the rear portion of vehicle 1 is provided with rigid bracket arms 2 arranged below the carrier 3 for the spare tire 4, and spaced apart an appropriate distance. Extension bars 5 are rigidly secured at 6 to the brackets 2, such extension bars extending in the same horizontal plane with the brackets.

Figure 2:
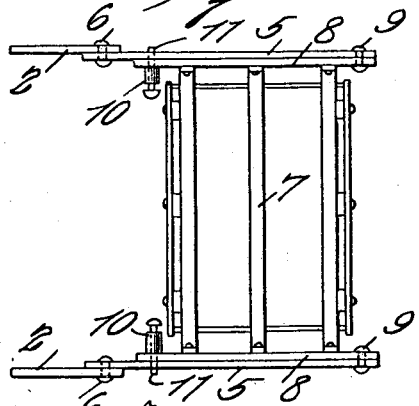
Figure 2 is a plan view of the luggage carrier illustrating particularly the mountings therefor.
Figure 3:
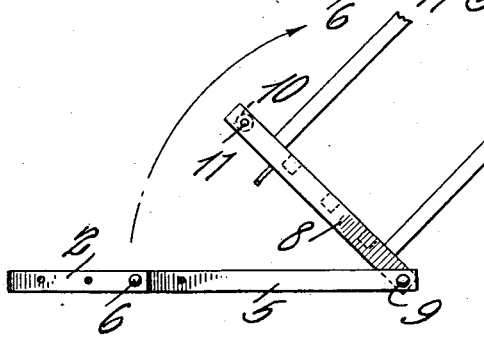
Figure 3 is a view in side elevation illustrating the movement for which the carrier is designed.

The luggage carrier, here shown as a framework 7 though obviously of any desired formation, such as a trunk, clothes receptacle, box, or the like, is mounted upon bars 8 pivotally secured at 9 to the extreme outer ends of the extension bars 5. The bars 8, when the luggage carrier is in operative or normal position, as indicated in Figures 1 and 2, are adapted to rest square against the inner surfaces of the bars 5, preventing any undue lateral play of the luggage carrier.

The inner or free ends of the bars 8 are provided with means whereby said bars may be locked to the bars 5, such locking means being of any conventional form and here shown as pins 10, which may, if desired, be spring-pressed, carried by the bars 8 and adapted to pass through openings 11 in the bars 5. Thus, when the luggage carrier is in normal or operative position, as indicated in Figures 1 and 2, the bars 8, which form a rigid part of the carrier proper, are locked with respect to the bars 5 to hold the carrier against movement. Obviously, the locking means 10 may be key-controlled to prevent unauthorized movement of the luggage carrier, such key-controlled lock being of conventional form and unnecessary to illustrate.

When it is desired to reach the spare tire or the spare tire carrier, the locking means 10 are released and the luggage carrier swung bodily rearwardly relative to the vehicle on the pivot supports 9. Full and convenient access is thus permited to the spare tire or spare tire carrier while the relation of the luggage carrier to the vehicle is such that it may be restored to operative position merely by swinging it forwardly in an obvious manner. Of course, the locking means 10 may be in the form of spring catches, in which event the mere swinging of the luggage carrier to normal position will cause the same to be at least temporarily secured in such position against casual displacement.

What I claim to be new is:

A luggage carrier including extension bars rigid with the frame of the vehicle, a boxlike receptacle of more or less skeleton form including supporting bars, pivotal connections between one end of the supporting bars and the free ends of the extension bars, the opposite ends of the supporting bars being extended beyond the receptacle, and means whereby the extended portions of the supporting bars may be interlocked with the extension bars when the receptacle is in an upright position, the pivotal movement of the receptacle on the extension bars moving said receptacle bodily from the vehicle to permit free access to the rear end of the vehicle.

In testimony whereof I affix my signature.

HENRY D. PUFFE.